United States Patent [19]

Murty

[11] Patent Number: 4,724,710

[45] Date of Patent: Feb. 16, 1988

[54] ELECTROMAGNETIC TORQUE SENSOR FOR A ROTARY SHAFT

[75] Inventor: Balarama V. Murty, Sterling Heights, Mich.

[73] Assignee: General Motors Corporation, Detroit, Mich.

[21] Appl. No.: 944,865

[22] Filed: Dec. 22, 1986

[51] Int. Cl.[4] .................................................. G01L 3/10
[52] U.S. Cl. .................................... 73/862.33; 324/208
[58] Field of Search ....................... 73/862.33; 324/208

[56] References Cited

U.S. PATENT DOCUMENTS

| | | | |
|---|---|---|---|
| 3,204,453 | 9/1965 | Neher | 73/862.33 |
| 4,119,911 | 10/1978 | Johnson, Jr. | 73/862.33 X |
| 4,448,275 | 5/1984 | Kitagawa et al. | 73/862.33 X |

*Primary Examiner*—Charles A. Ruehl
*Attorney, Agent, or Firm*—Mark A. Navarre

[57] ABSTRACT

An electromagnetic sensor for measuring the twist of a rotary shaft in response to the transmission of torque therethrough. Rotary magnetic sleeve means coupled to longitudinally displaced points on the shaft rotate relative to each other in proportion to the shaft deformation. Permanent magnets provide a source of magnetic flux, and a magnetic flux path is defined by a combination of the rotary sleeve means and a segmented stationary sleeve means. Relative rotation of the rotary sleeve means with deformation of the shaft progressively alters the density of the magnetic flux in the segmented stationary sleeve means, and a magnetic flux transducer positioned in an air gap between the stationary sleeve means segments detects the flux density therein to provide an indication of the amount of torque transmitted through the shaft.

8 Claims, 5 Drawing Figures

ELECTROMAGNETIC TORQUE SENSOR FOR A ROTARY SHAFT

This invention relates to measuring the torque transmitted through a rotary shaft, and more particularly, to an electromagnetic sensor responsive to deformation of the shaft under load.

It is well known in the torque sensing art that the deformation, or twist, of a rotary shaft under load can be sensed as a measure of the torque being transmitted through the shaft. In relatively low torque applications where the amount of twist may be too small for accurate measurement, such as in automotive power steering systems, the twist is typically augmented by inserting a torsion bar between two relatively rigid sections of the shaft. The relative rotation of the more rigid sections of the shaft may be mechanically or electrically detected using a variety of techniques.

Ideally, a torque sensing arrangement should have the following characteristics. The sensor, if electrical or electromagnetic, should have a stationary transducer element, avoiding the need for slip rings or other rotating or sliding contact arrangements. This is true even in limited rotation applications, such as in automotive steering, since movement of the electrical cables increases the likelihood of failures due to mechanical fatigue or interference. The sensor should be noncontacting, meaning that the sensor elements do not physically contact each other in normal operation. Contacting operation invariably introduces hysteresis error and the possibility of failure due to mechanical bind-up. The sensor should be amenable to mass production, with liberal tolerances on the parts. The sensor should be reasonably easy to calibrate in mass production. And finally, the sensor should be capable of redundant torque measurement to permit continued operation in the event of a transducer failure.

The object of this invention is to provide an improved torque sensor having the characteristics set forth above. This and other objects are carried forward with a noncontacting electromagnetic sensor having a magnetic flux sensitive transducer and relatively rotatable sleeve members disposed within a stationary sensor housing which define a variable magnetic flux path in the vicinity of the flux transducer. The torque transmitting shaft is fitted with a torsion bar and the sleeves are connected to opposite ends thereof. First and second concentric sleeves, referred to herein as inner and outer sleeves, are rigidly connected to one end of the torsion bar. A third sleeve, referred to herein as the intermediate sleeve, is radially disposed between the first and second sleeves and is rigidly connected to the other end of the torsion bar. A fourth sleeve, referred to herein as the housing sleeve, is secured to the inner periphery of the sensor housing.

The inner sleeve comprises a number of radially magnetized permanent magnets disposed in alternating polarity on a magnetic core. The outer sleeve comprises two sets (north and south) of interdigitated salient poles, each set emanating from an annular flux ring disposed at either end of the sleeve. Together, these poles are equal in number to, and radially aligned with, the permanent magnets of the inner sleeve. The intermediate sleeve comprises a ring of alternately magnetic and nonmagnetic complementary T-shaped elements disposed between the inner and outer sleeves to define a magnetic flux coupling between the permanent magnets and the interdigitated poles. The housing sleeve comprises a pair of magnetic sections defining a flux path between the flux rings of the outer sleeve, and the flux transducer is disposed in an air gap between such sections for detecting the magnetic flux density therein.

Transmission of torque through the torsion bar produces rotation of the intermediate sleeve relative to the inner and outer sleeves in relation to the magnitude and direction of the torque. A minimum flux condition results when the magnetic elements of the intermediate sleeve are centered between respective pairs of adjacently disposed permanent magnets of the inner sleeve. In this state, the magnetic elements of the intermediate sleeve and the flux ring of the inner sleeve shunt the magnetic flux of the permanent magnets, and a minimum amount of flux enters the interdigitated poles of the outer sleeve and the stationary segments of the sensor housing. A maximum flux condition results when the magnetic elements of the intermediate sleeve are centered over single permanent magnets of the inner sleeve. In this state, the permanent magnets are fully coupled to the interdigitated poles of the outer sleeve and a maximum amount of magnetic flux of the permanent magnets is directed through the stationary housing sleeve.

The sensor is calibrated at the time of assembly such that the rotary position of the intermediate sleeve is substantially midway the minimum and maximum flux positions defined above with the torsion bar in an unloaded condition. The flux density in the stationary segments of the housing varies in a fixed relation to displacement of the intermediate sleeve from its calibrated position, and a lost motion mechanical coupling limits the twist of the torsion bar so that the flux density variation is maintained within a substantially linear operating region.

IN THE DRAWINGS

FIG. 1 is a cross-sectional view of the torque sensor of this invention as applied to the handwheel shaft of an automotive steering system.

FIGS. 2 and 3 are cross-sectional views along lines 2—2 and 3—3, respectively, of FIG. 1. FIG. 2 depicts the sensor in a minimum flux condition; FIG. 3 depicts the sensor in a maximum flux condition.

Figure 1:
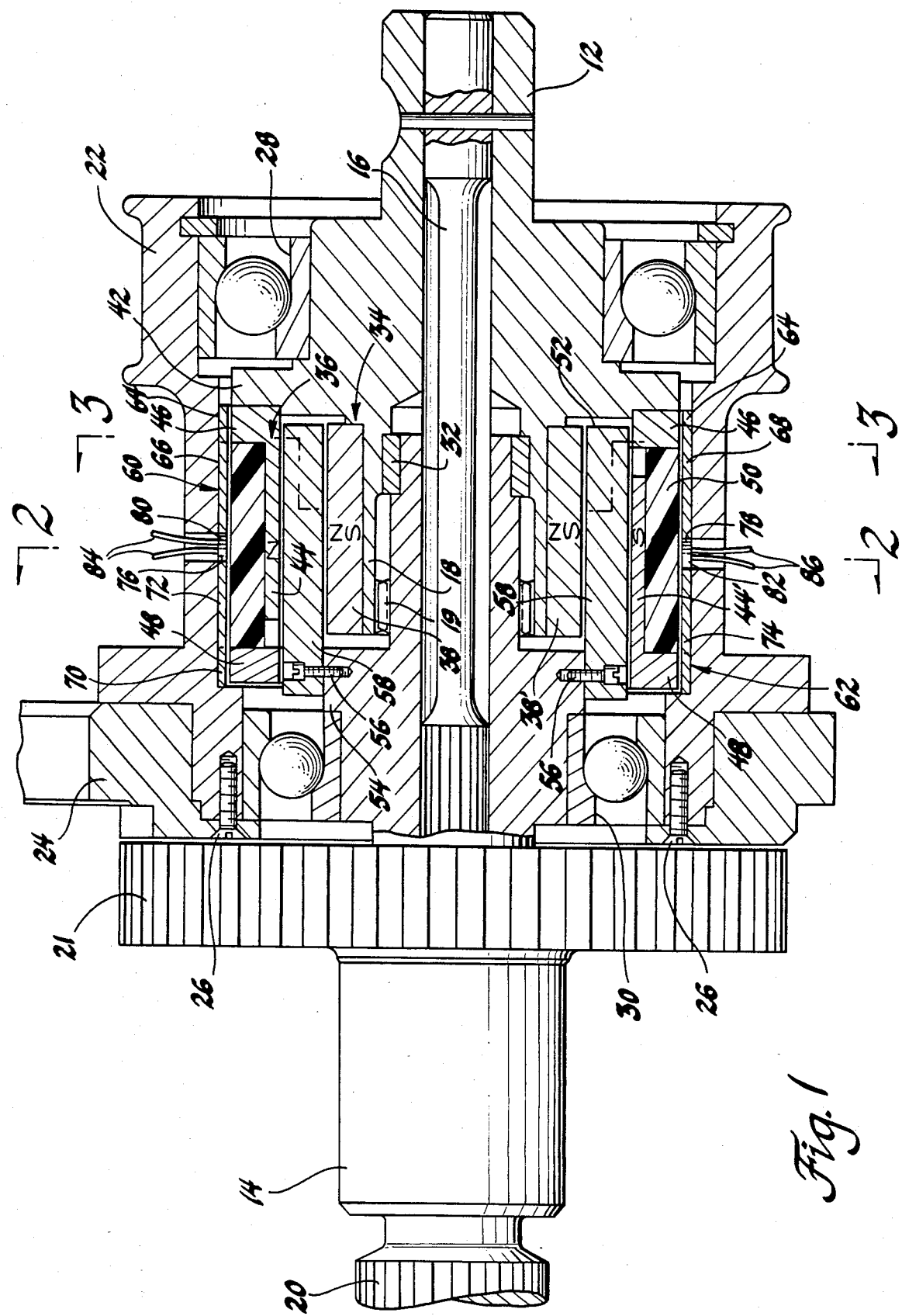

Referring now to the drawings, and more particularly to FIG. 1, the reference numeral 10 generally designates the electromagnetic torque sensor of this invention. The sensor 10 is depicted in connection with a power assisted automotive steering system of the type depicted in the U.S. Pat. No. 4,509,611 to Kade, et al. issued Apr. 19, 1985, and assigned to the assignee of the present invention. In such context, the torque sensor provides an indication of the driver-exerted steering torque, and a power assist mechanism, which may include an electric motor, is energized in relation to the indicated torque to generate steering assist torque which aids the driver-exerted torque.

Driver-exerted torque is applied to input shaft 12 through a conventional handwheel (not shown). The driver-exerted torque is transmitted to output shaft 14 via torsion bar 16. The right-hand or inboard end of torsion bar 16 is pinned to input shaft 12 at the time of assembly as described below, and the left-hand or outboard end of torsion bar 16 is press fit into the output shaft 14. The output shaft 14 is splined to an annular extension 18 of input shaft 12 as indicated by the reference numeral 19 to define a lost motion mechanical coupling. The coupling 19 limits the deformation or twist of the torsion bar 16 to a predetermined amount, such as ±3.5 mechanical degrees. Within the ±3.5 degrees of twist, the torsion bar 16 transmits the torque between input and output shafts 12 and 14. Torque in excess of that required to produce the ±3.5 degrees of twist is transmitted via the coupling 19.

A pinion gear 20 formed on the outboard end of output shaft 14 is adapted to drivingly engage the toothed rack of a rack-and-pinion steering mechanism. Also formed on the output shaft 14 is a power assist gear 21 adapted to be rotatably driven by the power assist mechanism to provide steering torque which aids that of the driver.

The various elements of sensor 10 are disposed within a nonmagnetic housing member 22. A bracket 24 secured to the housing 22 by the threaded fasteners 26 is adapted to be mounted on a stationary support member of the steering system, thereby providing a stationary support for the housing 22. Internally, the housing 22 is supported by the input and output shafts 12 and 14 on ball bearing assemblies 28 and 30. The output shaft 14 is further supported within a recess of input shaft 12 on the sleeve bearing 32.

An inner sleeve generally designated by the reference numeral 34 is supported by the input shaft 12 concentric with torsion bar 16. The inner sleeve 34 comprises a plurality of adjacently disposed permanent magnets 38 and 38' supported on and magnetically linked by the annular extension 18 of input shaft 12. The magnets are radially magnetized and of alternating polarity as shown in FIGS. 2-3, the magnets of one polarity (north pole facing inward) being designated by the reference numeral 38 and the magnets of the other polarity (north pole facing outward) being designated by the reference numeral 38'.

An outer sleeve, generally designated by the reference numeral 36, is supported on a radial extension 42 of input shaft 12 radially concentric with the housing 22 and the inner sleeve 34. The outer sleeve 36 comprises a plurality of interdigitated salient poles 44 and 44' emanating from a pair of annular flux rings 46 and 48. The poles 44 and 44' are supported on a nonmagnetic mounting ring 50, and are equal in number to the permanent magnets 38 and 38' of inner sleeve 34.

Figure 2:
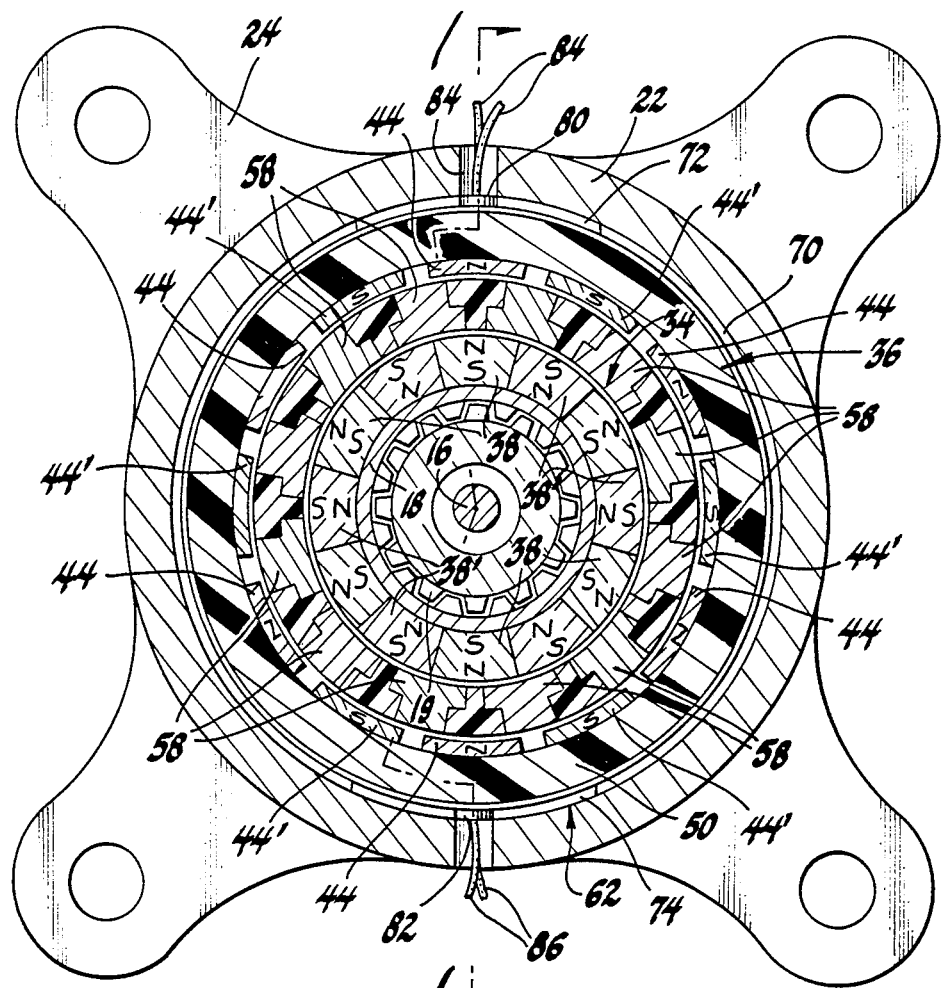
Figure 3:
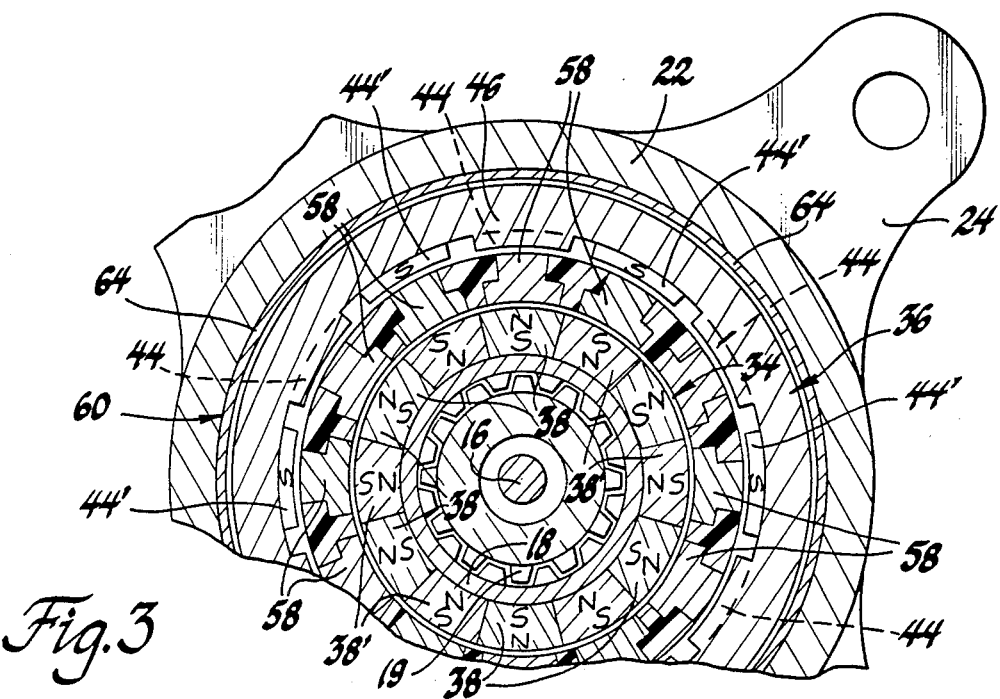

As best depicted in FIGS. 2-3, the inner and outer sleeves 34 and 36 are mounted such that each salient pole 44 is radially aligned with a permanent magnet 38, and each salient pole 44' is radially aligned with a permanent magnet 38'. As indicated in FIGS. 2-3, the various interdigitated poles and the flux rings from which they emanate assume the magnetic polarity of the permanent magnet with which they are radially aligned. Thus, the flux ring 46 assumes a north polarity, and the flux ring 48 assumes a south polarity.

An intermediate sleeve generally designated by the reference numeral 52 is secured on a radial extension 54 of output shaft 14 with threaded fasteners 56. The sleeve 52 is concentric with and intermediate to the inner and outer sleeves 34 and 36, and comprises an assembly of alternately magnetic and nonmagnetic elements 58 and 58'. The magnetic elements 58 are equal in number to the permanent magnets 38 and 38' of inner sleeve 34 and the poles 44 and 44' of the outer sleeve 36, and are arcuate or T-shaped in section for bridging radially aligned permanent magnets 38, 38' and salient poles 44, 44'.

Figure 5:
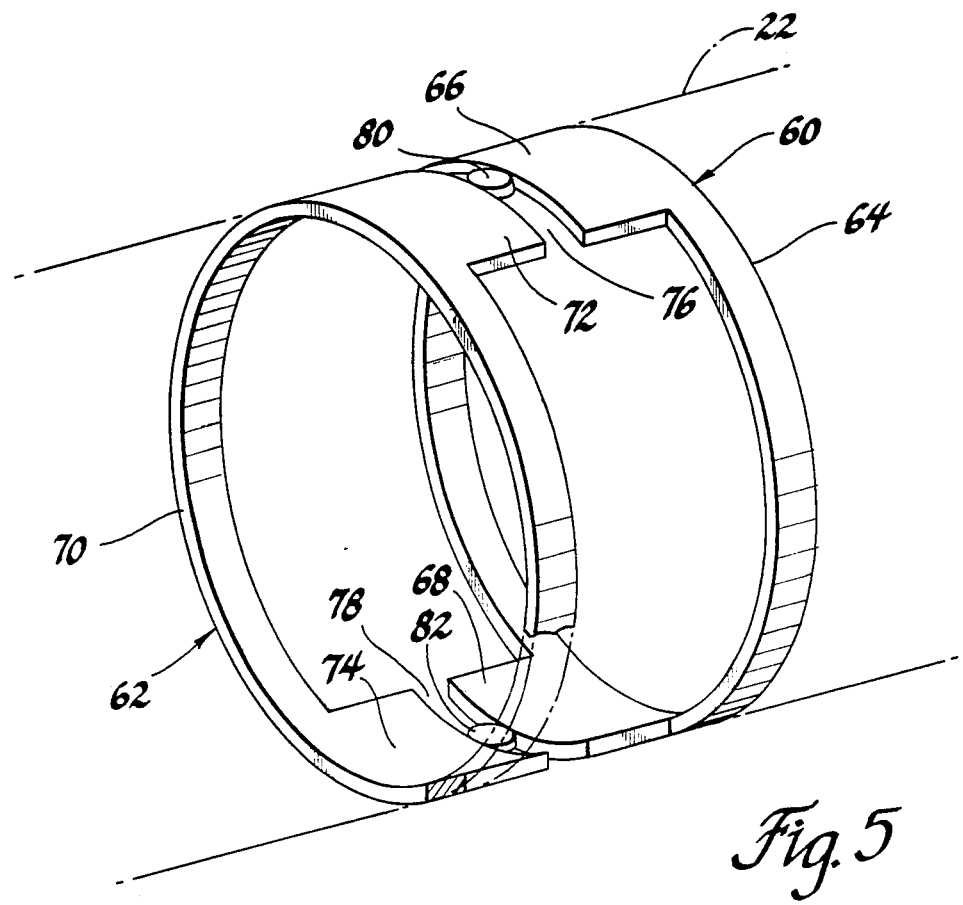
FIG. 5 is a perspective view of the segmented housing sleeve of the sensor.

A segmented housing sleeve comprising a pair of stationary magnetic sleeves 60 and 62 is secured to the inner periphery of the sensor housing 22 in close proximity to the outer sleeve 36. The sleeves 60 and 62 define the final magnetic circuit elements of the torque sensor 10, and provide a high density flux path between the flux rings 46 and 48. As best seen in FIG. 5, the sleeve 60 comprises an annular portion 64 in radial alignment with flux ring 46 and a pair of projections 66 and 68 extending from the annular portion 64 in the direction of the flux ring 48. Similarly, the sleeve 62 comprises an annular portion 70 in radial alignment with flux ring 48 and a pair of projections 72 and 74 extending from the annular portion 70 in the direction of the flux ring 46. The projections 66 and 68 are aligned with the projections 72 and 74, defining a pair of air gaps 76 and 78 therebetween.

A magnetic flux sensitive transducer 80 is mounted in the air gap 76 for detecting the magnetic flux density therein; and a magnetic flux sensitive transducer 82 is mounted in the air gap 78 for detecting the magnetic flux density therein. The flux density sensed by the transducers 80 and 82 should be the same, thereby providing redundant detection of the torque. The transducers 80 and 82 may be implemented with magneto-resistive devices, Hall Effect devices, or any other devices having an output characteristic which varies with magnetic flux density. In the illustrated embodiment, the transducers are magneto-resistive devices, and a pair of electrical cables 84, 86 for each transducer is passed through an opening in the sensor housing 22. In an automotive steering application, the cables 84, 86 are routed to an electronic steering controller (not shown), where the resistance characteristic is monitored as an indication of torque.

The magnetic circuit of the sensor 10 comprises the magnetic core 18, the permanent magnets 38, 38', the magnetic elements 58 of the intermediate sleeve 52, the interdigitated poles 44, 44', the flux rings 46, 48, and the sleeves 60, 62. Flux emanating from the north poles of permanent magnets 38 passes across the air gap between the inner and intermediate sleeves 34 and 52, through radially aligned magnetic elements 58; across the air gap between the intermediate and outer sleeves 52 and 36, through the poles 44 and the flux ring 46; across the air gap between the outer and housing sleeves 36 and 60, through the annular portion 64 and projections 66, 68; across the air gaps 76 and 78 containing flux transducers 80 and 82, through the projections 72, 74 and annular portion 70; across the air gap between the housing and outer sleeves 62 and 36, through the flux ring 48 and the poles 44'; across the air gap between the poles 44' and intermediate sleeve 52, through the radially aligned magnetic elements 58; across the air gap between the intermediate and inner sleeves 52 and 34, into the south poles of the permanent magnets 38', through the magnetic core 18, and into the south poles of the permanent magnets 38.

Figure 4:
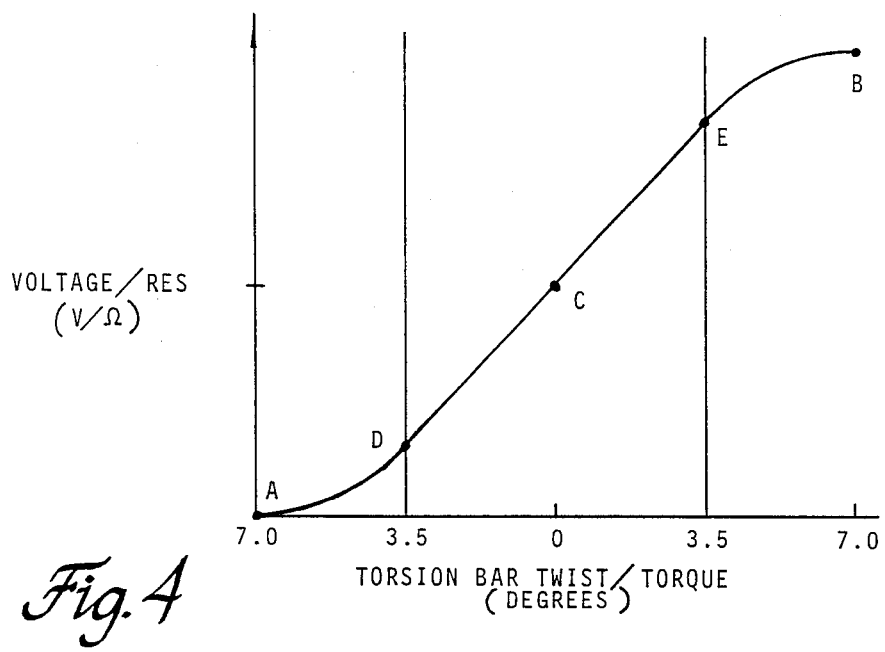
FIG. 4 is a graphical representation of the relationship between applied torque and the sensor output characteristic.

Transmission of torque through the torsion bar 16 produces rotation of the intermediate sleeve 52 relative to the inner and outer sleeves 34 and 36 in relation to the magnitude and direction of the torque. The relative rotation produces a corresponding change in the magnetic circuit of the sensor and the flux density detected by the transducers 80 and 82. The relationship between torsion bar twist and the transducer output characteristic—resistance in the case of a magneto-resistive device; voltage in the case of a Hall Effect device—is graphically depicted in FIG. 4.

As shown in the view of FIG. 2, a minimum flux condition results when the magnetic elements 58 of the intermediate sleeve 52 are centered between respective pairs of adjacently disposed permanent magnets 38, 38' of the inner sleeve 34. The magnetic elements 58 of the intermediate sleeve 52 and the flux ring 40 of the inner sleeve 34 shunt the magnetic flux of the permanent magnets 38, 38', and a minimum amount of flux enters the interdigitated poles 44, 44' of the outer sleeve 36 and the stationary sensor housing sleeves 60 and 62. This condition is depicted by the point A in the graph of FIG. 4.

As shown in the view of FIG. 3, a maximum flux condition results when the magnetic elements 58 of the intermediate sleeve 52 are centered over single permanent magnets 38, 38' of the inner sleeve 34. The permanent magnets 38, 38' are fully coupled to the interdigitated poles 44, 44' of the outer sleeve 36, and the full magnetic flux of the permanent magnets 38, 38', is directed through the stationary housing sleeves 60 and 62. This condition is depicted by the point B in the graph of FIG. 4.

The sensor is calibrated at the time of assembly such that the rotary position of the intermediate sleeve 52 is substantially midway the minimum and maximum flux positions defined above with the torsion bar 16 in an unloaded or rest condition. Initially, the torsion bar 16 is rotatable within the input shaft 12. When the midpoint position is attained, the end of the torsion bar 16 is drilled and pinned to the input shaft 12, as depicted in FIG. 1, to maintain the calibrated position. Such position is represented by the point C in the graph of FIG. 4. This is a null or zero torque position; the transmission of clockwise torque will result in an increase in voltage/resistance, and the transmission of counterclockwise torque will result in a decrease in voltage/resistance.

As indicated above, the splined coupling 19 limits the relative rotation to approximately ±3.5 mechanical degrees. This limits the operating range of the sensor to the area within the points D and E in the graph of FIG. 4, resulting in a linear relationship between torque and output characteristic variation.

From the above, it will be seen that the torque sensor of this invention has all of the ideal sensor characteristics initially set forth herein. It incorporates a transducer (or transducers) which remain stationary while the shaft is rotating. Its elements are noncontacting, eliminating the need for slip rings or other electrical rotating or sliding contacts. It is amenable to mass production because it exhibits the variation in detected flux density without stringent tolerances on the dimensions of the air gaps. It is reasonably easy to calibrate in mass production, as explained above. And finally, it provides torque detection redundancy when plural magnetic transducers 80, 82 are positioned in the housing sleeve.

While this invention has been described in reference to the illustrated embodiment, it will be recognized that various modifications will occur to those skilled in the art and that sensors incorporating such modifications may fall within the scope of this invention, which is defined by the appended claims.

The embodiments of the invention in which an exclusive property or privilege is claimed are defined as follows:

1. A sensor mechanism for sensing the magnitude and direction of torque transmitted through a rotary shaft, comprising:
   rotor means rigidly secured to the shaft for rotation therewith, including inner, intermediate, and outer radially displaced rotary sleeve means disposed about said shaft in substantial longitudinal alignment, the inner and outer sleeve means comprising magnetic flux sources and magnetic flux conducting elements defining a plurality of radially extending magnetic flux paths magnetically linked at said inner sleeve means and extending radially through the intermediate sleeve means, and the intermediate sleeve means comprising magnetic flux conducting elements adapted to variably bridge the sources and flux conducting elements of said inner and outer sleeve means, the intermediate sleeve means being secured to said shaft at a point longitudinally displaced from that of said inner and outer sleeve means so that deformation of said shaft due to transmission of torque therethrough produces rotation of said intermediate sleeve means relative to said inner and outer sleeve means and a corresponding variation in the bridging of the sources and flux conducting elements of the inner and outer sleeve means;
   stator means supported so as to remain stationary with respect to said shaft, including a pair of stationary magnetic flux conducting sleeve means adjacently disposed to define an air gap therebetween, and radially disposed about said outer rotary sleeve means in substantial longitudinal alignment therewith for providing a magnetic flux path for coupling the magnetically linked radially extending flux paths, thereby completing a magnetic flux circuit through said inner, intermediate and outer rotary sleeve means; and
   magnetic flux density transducer means mounted in the air gap between said pair of stationary magnetic flux conducting sleeve means for generating an electrical output signal in accordance with the density of the magnetic flux passing therethrough, thereby to provide an indication of the magnitude and direction of torque transmitted through said shaft.

2. A sensor mechanism as set forth in claim 1, wherein the shaft comprises a two rigid sections joined by a twistable torsion bar, the inner and outer sleeve means are secured to the rigid shaft section on one end of the torsion bar, and the intermediate sleeve is secured to the rigid shaft section on the other end of the torsion bar.

3. A sensor mechanism as set forth in claim 2, including a lost motion mechanical coupling between the two rigid shaft sections which limits twist of the torsion bar.

4. A sensor mechanism as set forth in claim 1, wherein the inner sleeve means comprises an annular magnetic flux conducting member, and a plurality of radially magnetized permanent magnets of alternately north and south polarity disposed about the outer circumference thereof.

5. A sensor mechanism for sensing the magnitude and direction of torque transmitted through a rotary shaft, comprising:
   inner and outer radially displaced sleeve means disposed about the shaft in substantial longitudinal alignment and mutually secured to the shaft for rotation therewith, the inner sleeve means comprising a plurality of radially magnetized permanent magnets of alternately north and south polarity disposed on and magnetically linked by an annular magnetic flux conducting member, and the outer sleeve means comprising a north rotary flux ring adapted to collect magnetic flux associated with the north polarity permanent magnets of the inner sleeve means, and a south rotary flux ring longitudinally displaced from said north flux means and adapted to collect magnetic flux associated with the south polarity permanent magnets of the inner sleeve means;

intermediate sleeve means disposed between the inner and outer sleeve means in substantial longitudinal alignment therewith, comprising north flux conducting elements adapted to variably bridge individual north polarity permanent magnets of the inner sleeve means with the north rotary flux ring of the outer sleeve means, and south flux conducting elements adapted to variably bridge individual south polarity permanent magnets of the inner sleeve means with the south rotary flux ring of the outer sleeve means, the intermediate sleeve means being secured to said shaft at a point longitudinally displaced from that of said inner and outer sleeve means so that deformation of said shaft due to transmission of torque therethrough produces rotation of said intermediate sleeve means relative to said inner and outer sleeve means and a corresponding variation in the bridging of the permanent magnets with the respective north and south rotary flux rings;

stationary sleeve means supported so as to remain stationary with respect to said shaft, and radially disposed about said outer rotary sleeve means, comprising north and south stationary flux rings disposed in substantially longitudinal alignment with said north and south rotary flux rings, and adjacently disposed to define an air gap therebetween, thereby completing a magnetic flux circuit through said inner, intermediate and outer rotary sleeve means; and magnetic flux density transducer means mounted in the air gap between said north and south stationary flux rings for generating an electrical output signal in accordance with the magnetic flux density therein, thereby to provide an indication of the magnitude and direction of torque transmitted through said shaft.

6. A sensor mechanism as set forth in claim 5, wherein the shaft comprises a two rigid sections joined by a twistable torsion bar, the inner and outer sleeve means are secured to the rigid shaft section on one end of the torsion bar, and the intermediate sleeve is secured to the rigid shaft section on the other end of the torsion bar.

7. A sensor mechanism as set forth in claim 6, including a lost motion mechanical coupling between the two rigid shaft sections which limits the twist of the torsion bar.

8. A sensor mechanism as set forth in claim 5, wherein the outer sleeve means comprises a plurality of longitudinally extending north salient poles emanating from the north rotary flux ring in radial alignment with the north permanent magnets of the inner sleeve means, and a plurality of longitudinally extending south salient poles emanating from the south rotary flux ring in radial alignment with the south permanent magnets of the inner sleeve means.

* * * * *